(12) United States Patent
Chen et al.

(10) Patent No.: US 10,873,251 B2
(45) Date of Patent: Dec. 22, 2020

(54) LINEAR MOTOR BASED ON RADIAL MAGNETIC TUBES

(71) Applicants: Qixing Chen, Hunan (CN); Qiyu Luo, Beijing (CN)

(72) Inventors: Qixing Chen, Hunan (CN); Qiyu Luo, Beijing (CN)

( * ) Notice: Subject to any disclaimer, the term of this patent is extended or adjusted under 35 U.S.C. 154(b) by 820 days.

(21) Appl. No.: 15/582,762

(22) Filed: Apr. 30, 2017

(65) Prior Publication Data

US 2017/0237329 A1    Aug. 17, 2017

Related U.S. Application Data

(63) Continuation-in-part of application No. PCT/CN2015/093306, filed on Oct. 30, 2015.

(30) Foreign Application Priority Data

Oct. 30, 2014   (CN) .......................... 2014 1 0616786
Mar. 5, 2015    (CN) .......................... 2015 1 0109879

(51) Int. Cl.

| | | |
|---|---|---|
| *H02K 41/03* | (2006.01) | |
| *H02K 11/215* | (2016.01) | |
| *H02K 11/30* | (2016.01) | |
| *B60L 13/03* | (2006.01) | |
| *B60L 13/04* | (2006.01) | |
| *B60L 13/10* | (2006.01) | |

(Continued)

(52) U.S. Cl.
CPC ........... *H02K 41/031* (2013.01); *B60L 13/03* (2013.01); *B60L 13/04* (2013.01); *B60L 13/10* (2013.01); *B64F 1/02* (2013.01); *F41B 6/003* (2013.01); *F41B 6/006* (2013.01); *H02K 7/003* (2013.01); *H02K 11/215* (2016.01); *H02K 11/30* (2016.01); *H02K 41/0352* (2013.01); *B60L 2200/26* (2013.01)

(58) Field of Classification Search
CPC .................................. H01F 7/066; F42B 6/006
USPC ....... 310/13, 12.01, 12.19, 12.21, 12.24, 15, 310/27, 12.07; 124/3, 54
See application file for complete search history.

(56) References Cited

U.S. PATENT DOCUMENTS 7,040,481 B1 * 5/2006 Sommerhalter, Jr. ....................... H02K 41/03 104/290
2008/0272659 A1 * 11/2008 Jeong ..................... H01H 33/38 310/28

(Continued)

FOREIGN PATENT DOCUMENTS

RU           2489309 C2 *  9/2011   ............. B63G 11/00

OTHER PUBLICATIONS

Machine translation of RU 2489309 C2 retrieved from EPO.*

*Primary Examiner* — Quyen P Leung
*Assistant Examiner* — Minki Chang

(57) ABSTRACT

A liner motor based on radical magnetic tubes includes: a dynamicer (mover, QDZ) and a stator (STA), the structure of the stator (STA) is: a stator magnetic tube (SCG) is nested into the inner wall of a pure iron tube (DTG), the stator magnetic tube (SCG) provides a radial magnetic field, a stator tube (DZGD) is formed within the stator magnetic tube (SCG), the dynamicer can travel in the stator tube; the dynamicer iron core is a tube of a radial magnetic field and installed on a tubular coil skeleton, on which winding the dynamicer coil to form the dynamicer main body; the sliders (HDZ) are installed on both ends of the dynamicer main body load.

3 Claims, 4 Drawing Sheets

(51) Int. Cl.
*B64F 1/02* (2006.01)
*F41B 6/00* (2006.01)
*H02K 7/00* (2006.01)
*H02K 41/035* (2006.01)

(56) References Cited

U.S. PATENT DOCUMENTS

| | | | | |
|---|---|---|---|---|
| 2010/0194212 A1* | 8/2010 | Proulx | ............ | F42B 6/00 |
| | | | | 310/12.07 |
| 2014/0306064 A1* | 10/2014 | Palmer | ............ | B64G 1/409 |
| | | | | 244/171.1 |
| 2014/0312716 A1* | 10/2014 | Hunter | ............ | H02K 41/031 |
| | | | | 310/12.18 |
| 2015/0228417 A1* | 8/2015 | Maruyama | ............ | H01H 33/38 |
| | | | | 335/187 |
| 2017/0317561 A1* | 11/2017 | Stolfus | ............ | G01D 5/145 |
| 2018/0216504 A1* | 8/2018 | De Mar | ............ | F01L 9/04 |

\* cited by examiner

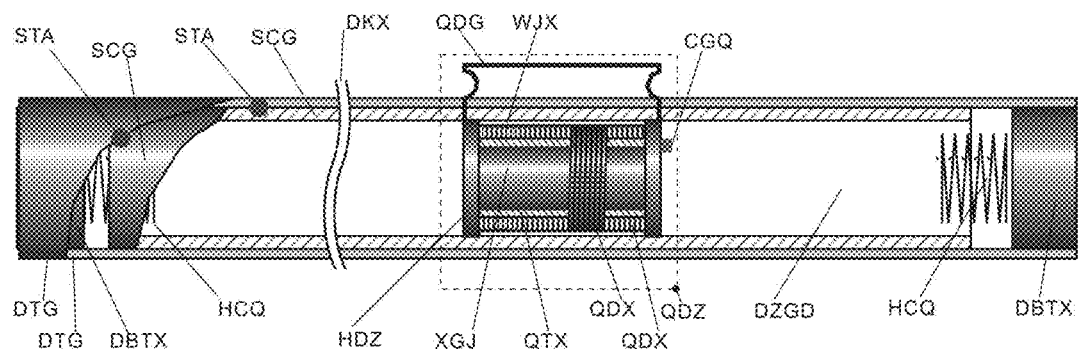
Fig. 1
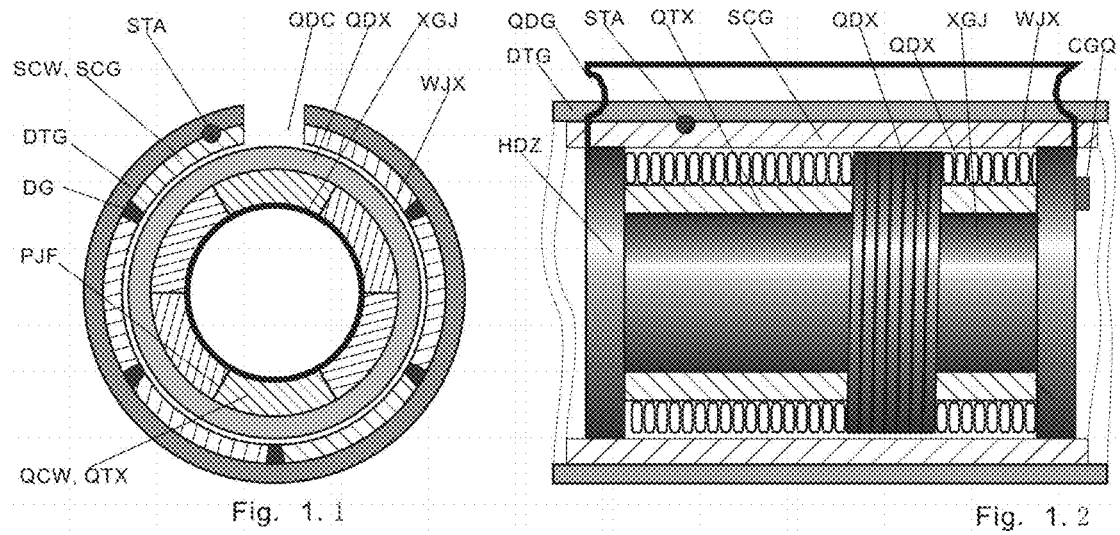
Fig. 1.1
Fig. 1.2
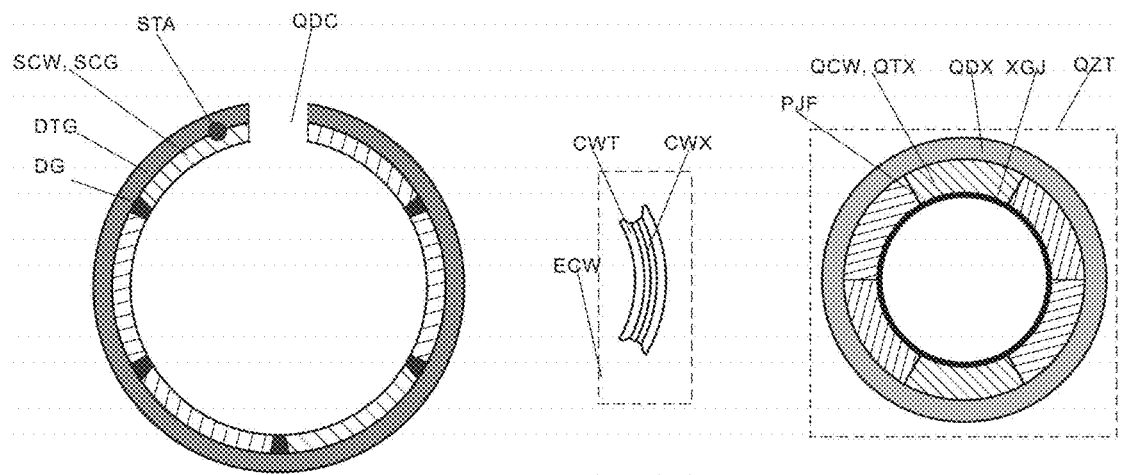
Fig. 1.3
Fig. 1.4
Fig. 1.5

LINEAR MOTOR BASED ON RADIAL MAGNETIC TUBES

CROSS REFERENCE OF RELATED APPLICATION

This is a Continuation-In-Parts application of the International Application PCT/CN2015/093306, filed Oct. 30, 2015, which claims priority under 35 U.S.C. 119(a-d) to CN 201410616786.X, filed Oct. 30, 2014, and CN 201510109879.8, filed Mar. 5, 2015.

BACKGROUND OF THE PRESENT INVENTION

Field of Invention

The present invention is a liner motor, relating to a field of motors, which is briefly called a radial magnetic tube motor.

Description of Related Arts

Linear motor has a lot of types such as: AC linear induction motor (LIM), AC linear synchronous motor (LSM), linear DC motor (LDM), linear pulse motor (LPM), linear electromagnetic solenoid motor (LES), linear oscillation motor (LOM), etc., wherein the AC linear induction motors has been well used in power-driving, such as high-speed rail, electromagnetic catapult aircraft carrier, etc. However, the technical complexity is very high, and reliability is not guaranteed.

Advantages of the linear electromagnetic solenoid motor (LES) are simple structure and brushless DC-driven. The linear electromagnetic solenoid motor (LES), commonly known as a voice coil motor, adapts the same principle as a speaker voice coil, which has an outer cylindrical magnetic pole sleeved on an inner cylindrical magnetic pole, so as to form a cylindrical gap between the inner and outer cylindrical magnetic poles, wherein a circular voice coil is provided in the gap and is able to slide along an inner circular axis. Conventionally, LES has obvious shortcomings mainly about problems of long-distance high-power driving.

SUMMARY OF THE PRESENT INVENTION

An object of the present invention is to solve LES problems of long-distance high-power driving, wherein after structure modification, a novel liner DC motor is obtained, which is DC-driven, powerful, highly efficiency and variable in driving power.

Principles of the present invention are as follows.

Definition: dynamicer: a tubular device producing the translational power.

Definition: radial magnetic field: namely, the inner arc is a magnetic pole, the outer arc is the another magnetic pole .all magnetic tube provide radial magnetic fields, in this article, all of the magnetic field is the radial magnetic field.

A liner motor based on radical magnetic tubes, referred to as a "magnetic tubes motor", comprising: a dynamicer (also known as a mover, QDZ) and a stator (STA), a length of the stator is far greater than a length of the dynamicer, in principle analysis the stator is regarded as infinitely long, electromagnetism pure iron referred to as pure iron, a structure of the stator (STA) is: a stator magnetic tube (SCG) nested into an inner wall of a pure iron tube (DTG), the stator magnetic tube (SCG) provides a radial magnetic field, a stator tube (DZGD) is formed within the stator magnetic tube (SCG), the dynamicer travels in the stator tube; the dynamicer is composed of a dynamicer main body (QZT) and sliders (HDZ), the dynamicer main body (QZT) comprises: a coil frame (XGJ), a dynamicer iron core (QTX) and a dynamicer coil (QDX); a dynamicer main body (QZT) structure is: a dynamicer iron core is a tube of a radial magnetic field and installed on a tubular coil skeleton, on which winding the dynamicer coil to form the dynamicer main body; after the sliders (HDZ) are installed on both ends of the dynamicer main body, which become dynamicer; a sensor group is installed on the dynamicer and the stator, to obtain some physical quantities, so as to control a size of drive current and voltage, after dynamicer coil is powered on, the current interacts with a stator magnetic field, forms an electromagnetic force, and drives dynamicer movement in the stator tube (DZGD), and the dynamicer drives a load by transmission mechanism; all magnetic tube provide radial magnetic fields, namely, the inner arc is a pole, the outer arc is the another pole.

For convenience, the follows vocabulary definitions and conventions are listed:

- Magnetic tile (stator magnetic tile (SCW) and dynamicer magnetic tile (QCW)), including electromagnet tile and hard ferromagnetic tile.
- Sectional shape: single cross sections comprise various curved cross sections (such as circular cross section, oval cross section, parabolic cross section) and polygonal cross sections (such as rectangular cross section, trapezoidal cross section); a complex cross section is a combination of a plurality of single cross sections, typically an arch cross section with a semicircular cross section at an upper portion and a rectangular cross-section at a lower portion. The sectional shape generally refers to single cross-sectional shapes and complex cross-sectional shapes.
- tube cross section: collectively, all kinds of cylindrical cross sections are call the tube cross section, referring to all tube, tube and shaft cross sections, which comprises cross sections of the stator (STA), iron tube (DTG), stator magnetic tube (SCG), gap tube (JXT), dynamicer iron core (QTX), protective case (HT), dynamicer magnetic tube (DZCT), drive coil (QDX), coil frame (XGJ), and slider (HDZ).
- Quasi-linear: if a curvature radius of a curved stator is infinite, the curved stator is considered to be a straight stator; for convenience, the dynamicer is defined as quasi-linear if a curvature radius thereof is twenty times of a length of the dynamicer. Therefore, straight lines comprise slightly curved lines.
- Radial magnetic tube: a permanent magnetic tube whose magnetic field lines are alone radial directions (also known as a radiation ring); namely, an inner arc is one pole and an outer arc is the other pole, wherein a polarity of the radial magnetic tube is marked according to a polarity of the inner arc. For example, $SCG_N$ represents an inner arc of the stator magnetic tube is an N pole.
- Reverse and unidirectional magnetic tubes: magnetic tubes with unidirectional magnetic field lines are called unidirectional magnetic tubes, and magnetic tubes with reverse magnetic field lines are called reverse magnetic tubes.
- Zero gap: it is considered to be zero gap if adjacent surfaces are closed contacted with each other without sliding, such as the protective case and the dynamicer magnetic tube, the dynamicer magnetic tube and the drive coil, and the drive coil and the coil frame.

Micro gap: the micro gap means a small gap with the adjacent surfaces, wherein the adjacent surfaces are not contacted and move without friction. If the adjacent surfaces are contacted in a lubrication form and the friction is very small, it is also considered to be a micro gap, such as the outer arc of the dynamicer.

External gaps: a gap between the outer arc of the dynamicer and the inner arc of the stator is the external gap.

Soft ferromagnetic materials are various, comprising Soft magnetic iron and silicon. According to the present invention, the Soft magnetic iron generally refers to the soft ferromagnetic materials (pure iron in short, which is marked by using a Chinese Soft magnetic iron mark DT, such as iron tube (DTG)). Hard ferromagnetic materials are various, comprising ferrite, and neodymium iron boron.

Complex: an object composed of a plurality of elements is call the complex. For example, the stator (STA) is a complex formed by the iron tube (DTG) with an inner arc sleeved on the stator magnetic tube (SCG) (with zero gap), wherein a point which a directional line directs to is replaced by a directional ring across the iron tube (DTG) and the external tube (SCG).

wherein the stator (STA) is formed by the long iron tube (DTG) sleeved on the stator magnetic tube (SCG), wherein the iron tube (DTG) is a long tube made of a soft ferromagnetic material, and the stator magnetic tube (SCG) is a radical magnetic tube made of a hard ferromagnetic material or magnetic iron; an inner arc of the stator magnetic tube (SCG) is an inner arc of the stator (STA); an internal shape of a cross section of the stator (STA) is identical to an external shape of a cross section of the dynamicer (QDZ); an inner diameter of the cross section of the stator (STA) is slightly larger than an outer diameter of the cross section of the dynamicer (QDZ), in such a manner that the stator (STA) is sleeved on the dynamicer (QDZ) with a micro gap;

dynamicer: the dynamicer (QDZ) comprises the dynamicer main body and the sliders (HDZ);

wherein the dynamicer main body comprises: the dynamicer iron core (QTX), the drive coil (QDX), and a coil frame (XGJ);

wherein the dynamicer iron core (QTX) is of a soft magnetic type or a hard magnetic type; at least one insulation gap (JYF) is arranged in a plane with determined radical and axial directions of the hard magnetic dynamicer iron core or the soft magnetic dynamicer iron core made of a metal material, in such a manner that no loop is formed along a circumference of the dynamicer iron core (QTX);

wherein the drive coil (QDX) is formed by winding on the coil frame (XGJ);

wherein a magnetic line direction of the stator is perpendicular to a cylindrical wall of the drive coil (QDX); the drive coil (QDX) bears an axial force after being electrified, so as to move the dynamicer (QDZ) in the gap tube (JXT) along the internal magnetic shaft (NCZ); the axial force on the drive coil (QDX) is adjustable by adjusting a coil current; a driving hook (QDG) is mounted on the dynamicer (QDZ); the driving hook (QDG) passes through a driving slot (QDC) on the stator (STA) and extends outwards, so as to drive an object to move; for decreasing a friction during dynamicer moving, the sliders (HDZ) are installed at both ends of the dynamicer main body;

Buffers (HCQ) are installed at stator ends for decreasing an impact on the stator ends caused by the dynamicer (QDZ).

BRIEF DESCRIPTION OF THE DRAWINGS

References have be explained in former figures will listed directly, only explaining new references.

FIG. 1 is a front view of a radial magnetic tube motor;
wherein (CTDJ—magnetic cylinder motor, which is not shown in FIG. 1 since FIG. 1 shows CTDJ as a whole; CTDJ is shown in FIGS. 7 and 7.1), STA—stator (the structure of the stator (STA) is: a stator magnetic tube (SCG) nested into the inner wall of a pure iron tube (DTG))); SCG—stator magnetic tube; DKX—break line; QDG—driving hook; WJX-external gap, gap between external wall of dynamicer magnetic tube and internal wall of stator; CGQ—sensor group; DTG—electromagnetism pure iron tube referred to as pure iron tube; DBTX—end iron core; HCQ—buffer; HDZ—slider; XGJ—the coil frame; QTX—dynamicer iron core; QDX—dynamicer coil; QDZ—dynamicer; DZGD—stator tube.

FIG. 1.1 is a sectional view of the radial magnetic tube motor;
wherein: PJF—joint seam or cut a insulation seam; QTX; QCW—dynamicer magnetic tile; (QCW,QTX)—dynamicer magnetic tiles (QCW) and dynamicer iron core (QTX), dynamicer iron core (QTX) is composed of many dynamicer magnetic tiles (QCW), so in FIG. 1.5 (QTX) and (QCW) point to the same place); DG—rail; DTG; SCG; (SCW, SCG)—stator magnetic tile (SCW) and stator magnetic tube (SCG), stator magnetic tube (SCG) is composed of many stator magnetic tiles (SCW) in the inner arc of the pure iron tube (DTG) joining together and become, So in FIG. 1.3 (SCW) and (SCG) point to the same place); STA; QDC—driving slot; QDX; XGJ; WJX are shown.

FIG. 1.2 is a front view of a dynamicer;
wherein: HDZ; DTG; QDG; STA; QTX; SCG; QDX; XGJ; WJX; CGQ; QDZ are shown.

FIG. 1.3 is a sectional view of the stator;
wherein: DG; DTG; (SCW,SCG); STA; QDC; SCG; QDG; QDX; XGJ; WJX are shown.

FIG. 1.4 is a sectional view of an electromagnet tile;
wherein: ECW—electromagnet tile, wherein the stator electromagnet tile and the dynamicer electromagnet tile; CWT—electromagnet tile iron core; CWX—electromagnet tile coil.

FIG. 1.5 is a sectional view of the dynamicer;
wherein: PJF; (QCW,QTX); QDX; XGJ; QZT—dynamicer main body are shown;

FIG. 2.1 is a sectional view of the complex shapes of the stator and the wheel-rail type slider;
wherein: HDT; GL; DG; DTG; (SCW,SCG); STA; QDG; QDC; WJX are shown.

FIG. 2.2 is a sectional view of the complex shapes of the stator and the maglev type slider;
wherein: HDT; XFC—maglev magnet; DTG; SCG; STA; QDG; QDC; WJX are shown.

wherein: ZLS—cable; FJ—aircraft; QYK; QYL are shown.

Figure 7:
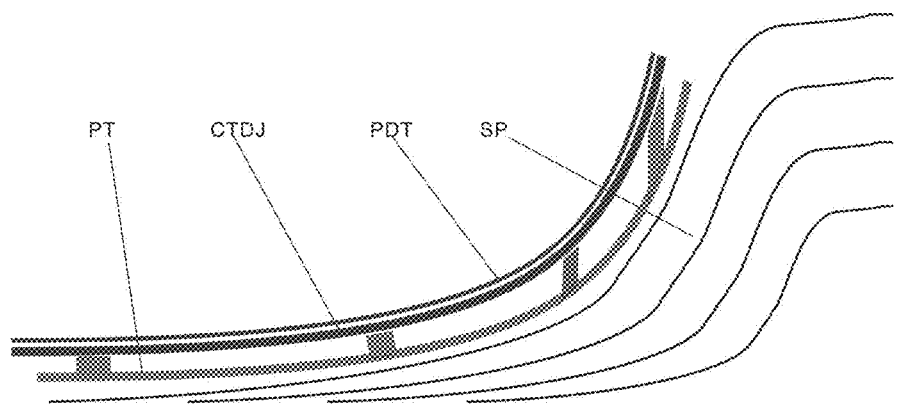

FIG. 7 is a side view of a railgun;

wherein: PDT—shell barrel; CTDJ—magnetic cylinder motor; SP—hillside; PT—supporter are shown.

FIG. 7.1 is a sectional view of the railgun;

wherein PDT—shell barrel; CTDJ—magnetic cylinder motor; QDC—driving slot; MFG—sealing tube; DLC—cable car are shown.

Figure 8:
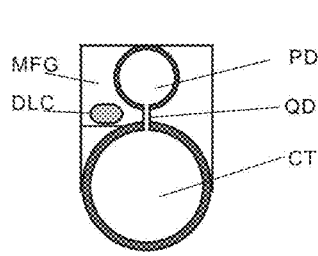
Figure 8:
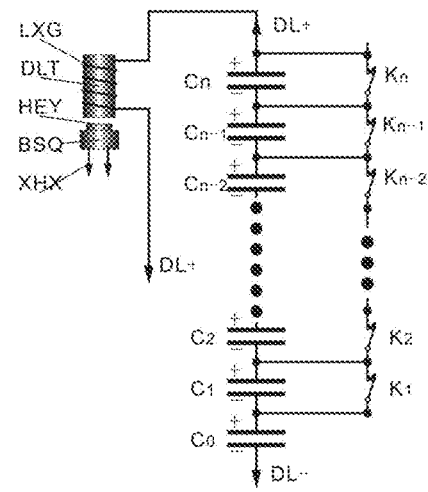

FIG. 8 is a sketch view of a power source with graded capacitors or batteries;

wherein C0~Cn—graded capacitors or batteries; K1~Kn—graded switches; DL+—power cable positive pole; DL-—power cable negative pole; LXG—solenoid; DLT—current monitoring iron core; HEY—Hall element; BSQ—transmitter; XHX—signal line are shown.

DETAILED DESCRIPTION OF THE PREFERRED EMBODIMENT

Embodiment 1

A liner motor based on radical magnetic tubes, referred to as "magnetic tubes motor", comprising: a dynamicer (also known as a mover, QDZ) and a stator STA, a length of the stator is far greater than a length of the dynamicer, in principle analysis the stator is regarded as infinitely long, a structure of the stator STA is: a stator magnetic tube SCG nested into an inner wall of a pure iron tube DTG, the stator magnetic tube SCG provides a radial magnetic field, a stator tube DZGD is formed within the stator magnetic tube SCG, the dynamicer travels in the stator tube; the dynamicer is composed of a dynamicer main body QZT and sliders HDZ, the dynamicer main body QZT comprises: a coil frame XGJ, a dynamicer iron core QTX and a dynamicer coil QDX; a dynamicer main body QZT structure is: the dynamicer iron core is a tube of a radial magnetic field and installed on a tubular coil skeleton, on which winding the dynamicer coil to form the dynamicer main body; after the sliders HDZ are installed on both ends of the dynamicer main body, which become dynamicer; a sensor group is installed on the dynamicer and the stator, to obtain some physical quantities, so as to control a size of drive current and voltage, after dynamicer coil is powered on, the current interacts with a stator magnetic field, forms electromagnetic force, and drives dynamicer movement in the stator tube DZGD, and the dynamicer drives a load by a transmission mechanism; all magnetic tube provide radial magnetic fields, namely, an inner arc is a pole, an outer arc is the another pole.

Embodiment 2

A hard ferromagnetic tile type stator magnetic tube SCG is a one-way radial magnetic field tube, and is composed of many stator magnetic tiles SCW joining together in the inner arc of the pure iron tube DTG, each of the stator magnetic tiles SCW provides a radial magnetic field, so the stator magnetic tube SCG provides a radial magnetic field too.

Embodiment 3

A hard ferromagnetic tube type stator magnetic tube SCG adopts an integral radial magnetic tube.

Embodiment 4

An electromagnet tile type stator magnetic tube SCG is composed of many radial electromagnet tiles (FIG. 1.4) joining together in the inner arc of the pure iron tube DTG, when the dynamicer runs to a certain position of the stator, the electromagnet tile at the certain position is powered on, to produce a radial magnetic field; when the dynamicer leaves a location, the electromagnet tile at the location is powered off, and the magnetic field disappeared.

Embodiment 5

A stator with a driving slot QDC, a structure thereof is: the driving slot QDC is drilled on the stator STA along a tube direction, a driving hook QDG of the dynamicer reaches out to outside of the driving slot QDC to drag a load, during dynamicer movement in the stator tube DZGD, driving hook QDG drives the load.

Embodiment 6

A structure of the dynamicer is: the sliders HDZ (FIG. 1.2) are install at both ends of the dynamicer main body QZT (FIG. 1.5); a dynamicer main body QZT structure is: on an outer of the tubular coil skeleton XGJ installed the tubular dynamicer iron core QTX, then on an outer of the dynamicer iron core QTX wound a coil, so as to form the tubular dynamicer coil QDX, the coil skeleton XGJ adding the dynamicer iron core QTX adding the dynamicer coil QDX is equal to the dynamicer main body QZT (FIG. 1.5), the dynamicer iron core is a radial hard ferromagnetic or an electromagnet tubular body, both the dynamicer iron core and the stator magnetic field are consistent in directions, responsible for intercepting negative magnetic lines, and changing magnetic field distribution, so that dynamicer position positive magnetic lines are greater than the negative magnetic lines, so, the dynamicer coil current produces electromagnetic force.

When the stator is infinitely long one-way magnetic field structure, due to the magnetic field lines as a closed curve, so a certain position in the middle of the stator, net value of positive and negative magnetic flux will be equal to zero, if you don't change the magnetic field distribution, dynamicer coil after electrify will not produce electromagnetic force.

Embodiment 7

A hard ferromagnetic dynamicer iron core QTX, there are two kinds: the an integral tube type QTX and the a dynamicer magnetic tile QCW splicing tube type, (so in FIG. 1.5, QTX and QCW point to a same place), in order to avoid eddy current, the dynamicer iron core QTX has insulation in a circumferential direction, ferrite itself is insulated, for a rubidium iron boron iron core, insulation in a joint seam PJF or an insulation seam PJF is provided; after the both ends of the dynamicer main body QZT are installed with the sliders HDZ, it becomes the dynamicer; after the dynamicer coil (QDX) is electrified and interacts with a magnetic field, an electromagnetic force is form, driving the dynamicer movement in the stator tube DZGD, the dynamicer drives the load by the transmission mechanism.

Embodiment 8

An electromagnet tile type dynamicer iron core which is composed of many radial electromagnet tiles (FIG. 1.4) joining together in the outer arc of the coil skeleton XGJ-.

Embodiment 9

Figure 2:
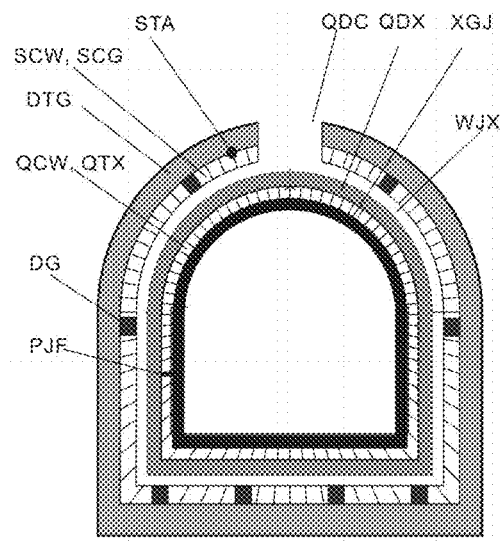
FIG. 2 is a sectional view of the complex shapes of the stator and the dynamicer main body;
wherein: PJF; DG; (QCW,QTX); DTG; (SCW,SCG); STA; QDC; QDX; XGJ; WJX are shown.

A cross section shape of the magnetic tubes motor, and all of the tubular cross section shape are round, oval, rectangle, polygon, and complex shapes; one of the complex shapes is an arch shape (FIG. 2), whose upper half is a semicircle and a lower part is a rectangle.

Embodiment 10

Figure 4:
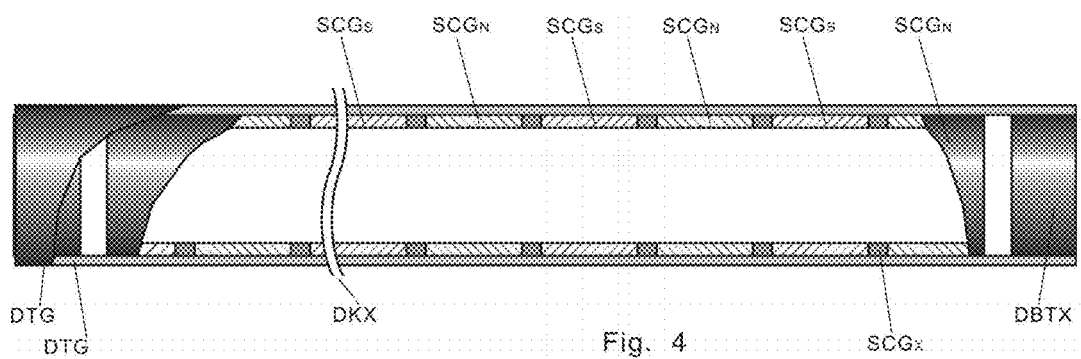
FIG. 4 is a front view of an alternating magnetic field arranged type stator magnetic tube;
wherein: DTG; DKX; SCGS—the stator magnetic tube inner arc is S; SCGN—the stator magnetic tube inner arc is N; SCGX—the tube without magnetic are shown.

An alternating magnetic field arranged type stator magnetic tube is provided, one type of the stator magnetic tube SCG is: the stator magnetic tube SCG is composed of many short magnetic tubes in connection, adjacent short magnetic tubes have opposite magnetic field directions (FIG. 4), in order to describe simply, Definitiona definition is: in these short magnetic tubes, an SCGN inner arc as theis an N pole, as a positive direction, and an SCGS inner arc as is the an S pole, as a negative direction, the stator magnetic tube inner arc is provides N-S-N-S alternating direction magnetic field, between the SCGN and the SCGS sandwiched a non-magnetic tube SCGX, i.e., SCGN-SCGX-SCGS-SCGX-SCGN-SCGX-SCGS-. . . alternatealternating, So willso as to form a huge number of magnetic circuits, avoiding the that a net value of positive and negative magnetic flux is equal to zero, wherein the dynamicer iron core QTX is made of a soft ferromagnetic material, or is omitted.

When the dynamicer QDZ is in an interval of the positive magnetic tube SCGN, the dynamicer coil QDX bears a positive driving force when being positively electrified and bears a negative driving force when being negatively electrified; conversely, when the dynamicer QDZ is in an interval of the negative magnetic tube SCGN, the dynamicer coil QDX bears a positive driving force when being negatively electrified and bears a negative driving force when being positively electrified; as a result, when the dynamicer QDX moves to an interval where the magnetic field direction changes, an electrifying direction of the dynamicer coil QDX is changed for guaranteeing a unidirectional driving force;

when the dynamicer QDZ is in an interval of the non-magnetic tube SCGX, the interval provides no driving force to the dynamicer coil QDX, which is a transition interval for changing a current direction of the dynamicer coil QDX; the current direction is changed by a controller after detecting whether the dynamicer QDZ is at a positive magnetic field interval, a negative magnetic field area or the transition interval.

Embodiment 11

Figure 3:
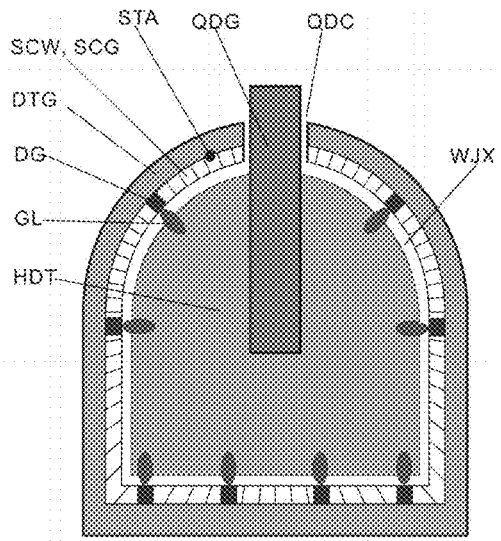
FIG. 3 is a sectional view of the complex shapes of a sealing pure iron tube stator and the dynamicer main body;
wherein: GL; CX—carriage; QTX; DTG; (SCW,SCG); STA; QDX; XGJ; WJX are shown.
Figure 3:
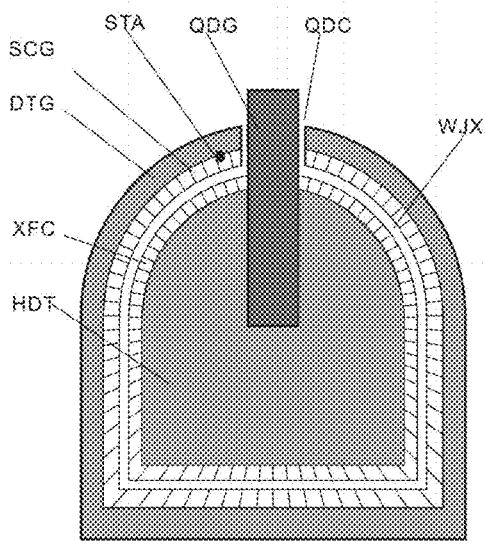
Figure 3:
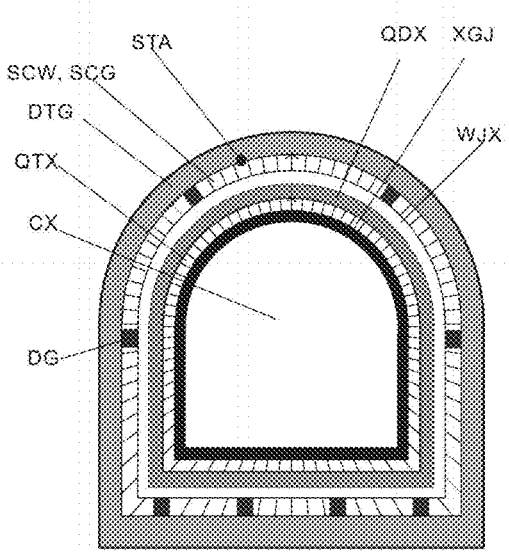

One of the stator structure is: the pure iron tube DTG is a sealing tube (FIG. 3), wherein a quasi vacuum tube is designed for running in a high-speed train, the dynamicer is used as a carriage CX after the stator tube is pumped into a quasi vacuum state, which greatly reduce air resistance of dynamicer motion.

Embodiment 12

One of the slider structure is a kind of a wheel-rail type sliding structure, rails (DG, see FIG. 1.3, FIG. 2.1) are installed in the stator inner arc and embedded in the stator magnetic tube SCG but not bulged out over the surface of the stator magnetic tube; the wheels GL is installed on a slider body HDT for slider (FIG. 2.1), wheels GL rotate on the rails DG, a driving hook QDG is fixed on the sliders HDZ; the rails DG have function of power wires and signal wires.

Embodiment 13

One of the slider structure is a maglevmagnetic levitation structure, a lap of electromagnets or hard ferromagnets is installed in a periphery of a slider body HDT (FIG. 2.2), referred to as a maglev magnet XFC, a magnetic field direction of the maglev magnet XFC reverses in a direction of the magnetic field of the stator magnetic tube SCG, two-magnet repulsion makes the sliders HDZ float; the sliders HDZ is a combination of the maglev type and a wheel-rail type.

Embodiment 14

There are two models of power supply to the coil, one is through the rails DG) power supply, the other is a cable through the a driving slot QDC, connecting the a power supply supplier and the dynamicer coil (QDX).

Embodiment 15

A sensor CGQ of the magnetic tube motor, a sensor group CGQ is installed on the dynamicer and the stator, to detect key physical quantities including velocity, force, position, and magnetic field direction, quantities are obtained to control the size of current and voltage.

Embodiment 16

Figure 5:
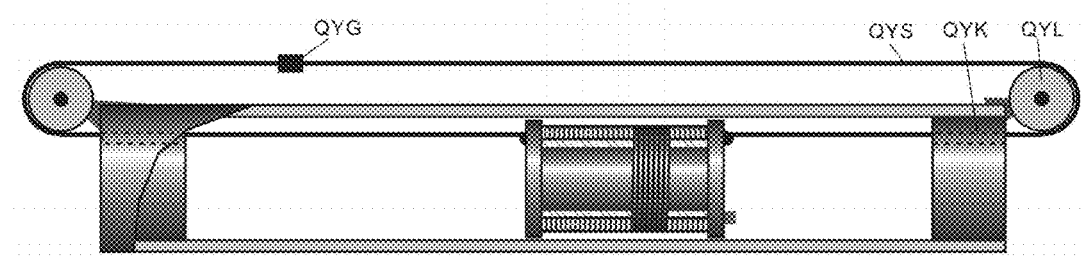
FIG. 5 is a front view of a traction magnetic tube motor;
wherein: QYL—traction roller; QYK—traction hole; QYS—traction rope; QYG—traction hook are shown.

A traction type magnetic tube motor (FIG. 5), pulleys called traction pulleys QYL are installed at both ends of the stator, and through holes called traction holes QYK are drilled at the end iron cores at both ends of the stator; both ends of a traction rope QYS respectively pass through the traction holes QYK and are connected to both ends of the dynamicer QDZ, and the dynamicer QDZ drives the traction rope QYS and a traction hook QYG for driving an external load.

Similarly, a traction rod may be used to replace the traction rope QYS, wherein a traction hook on the traction rod moves the external load.

Embodiment 17

Figure 6:
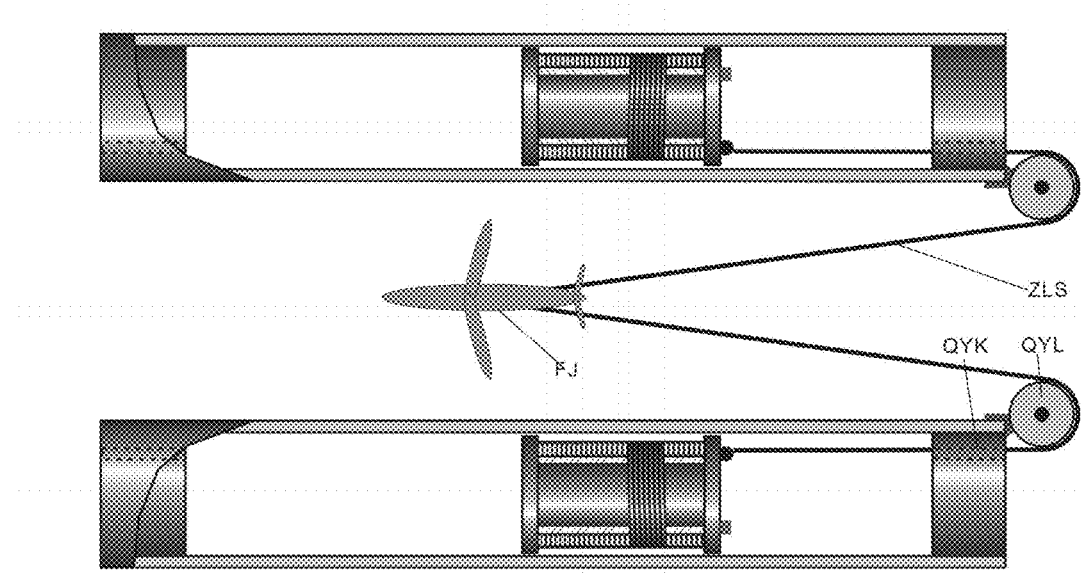
FIG. 6 is a front view of a cable made up by a pair of traction type magnetic tubes motors.

A kind of cable, made up by a pair of traction type magnetic tubes motors (FIG. 6), wherein a pair of traction type magnetic tubes motor traction ropes is connected into one, after the dynamicer is electrified, the cable ZLS produces reverse tension on an aircraft FJ, which produces an aircraft braking force.

Embodiment 18

Further comprising a structure to keep a driving force constant;

Notice: the higher speed of the dynamicer QDZ is, the larger the counter voltage is provided, the higher source voltage is offseted, the lower driving voltage will be the lower driving current will be the lower dynamicer driving force will be; for a load such as an aircraft, the driving force is basically kept constant within a catapult period, wherein for keep the driving voltage constant, the source voltage is increased as the dynamicer speed rises, so as to synchronously counter the dynamicer counter voltage; one of various methods for gradually increasing the source voltage is connecting power units in serious and gradually switching in; a method for gradually switching in the power units is a brush method or a switch method;

wherein the brush method is: installing a brush on a driving hook QDG, and gradually increasing the source electromotive force during brush sliding;

wherein the switch method is: during dynamicer moving, sending sensor signals to a control circuit for gradually turning on switches, so as to gradually increase the source electromotive force; and gradually turning off normally closed contacts K1, K2, . . . , Kn–2, Kn–1, Kn of the switches, wherein electromotive forces of the power units are gradually superposed between a power cable positive pole DL+ and a power cable negative pole DL–;

wherein a first type of the switches is: dynamicer position controlled switches, wherein a row of sensors are arranged beside a dynamicer rail; according to a dynamicer position, the sensor signals are sent to the control circuit for gradually turning on the switches, so as to gradually increase the source electromotive force;

wherein a second type of the switches is: dynamicer speed controlled switches, wherein a speed detecting coil is installed on the dynamicer QDZ, which acts as an individual dynamicer coil with an extreme-slim wire winding along a wire slot of the dynamicer coil QDX; when the dynamicer speed rises, speed signals from the speed detecting coil strengthen, the speed signals are sent to the control circuit for gradually turning on the switches, so as to gradually increase the source electromotive force;

wherein a third type of the switches is: dynamicer driving current controlled switches, wherein a coil is winded at a fixed end of a cable, an iron core is placed at a center of the coil; the iron core is directed to a transmitter based on a Hall element; when a current is lower than a pre-determined value, a magnetic induction intensity is lower than a pre-determined value; the magnetic induction intensity is detected by the transmitter and sent to the control circuit for turning on switches increasing the source electromotive force.

Embodiment 19

Further comprising a feedback braking structure;

wherein for feedback braking, after a load is launched, the dynamicer QDZ is braked; specifically, kinetic energy during dynamicer braking is recovered for being electric energy of a power supply; a position sensor is installed at a position where launch is completed, and a motor state is changed into a generator state; after the load is launched, the over QDZ still keeps a huge amount of the kinetic energy; when the dynamicer QDZ reaches the position where the position sensor is, a magnetic tube motor is changed from the motor state to the generator state, so as to charging the power source with power generated by the kinetic energy of the dynamicer QDZ.

Embodiment 20

A magnetic tube motor for a railgun and primary launch of a rocket; wherein the railgun is formed by the magnetic tube motor CTDJ and a shell barrel PDT, and the magnetic tube motor CTDJ drives a shell in the shell barrel PDT; a direction of the railgun is gradually changed from a horizontal direction to a direction pointing upwards; the railgun is long enough to adapt a large radius of curvature, which is gently curved and is installed on a supporter PT; for a gunpowder shell, a shell tail is flat for bearing an explosion power, resulting in large friction during flying; the shell of the railgun is catapulted and is streamlined, and friction during flying is much lower than the friction of the shell with the flat shell tail, which increases a firing range;

wherein the magnetic tube motor is also suitable for launch of the rocket, which adds a ground launch primary stage.

What is claimed is:

1. A magnetic tubes motor, comprising: a dynamicer (also known as a mover, QDZ) and a stator (STA), a length of the stator is greater than a length of the dynamicer, a structure of the stator (STA) is: a stator magnetic tube (SCG) nested into an inner wall of a pure iron tube (DTG), the stator magnetic tube (SCG) provides a radial magnetic field, a stator tube (DZGD) is formed within the stator magnetic tube (SCG), the dynamicer travels in the stator tube; the dynamicer is composed of a dynamicer main body (QZT) and sliders (HDZ), the dynamicer main body (QZT) comprises: a coil frame (XGJ), a dynamicer iron core (QTX) and a dynamicer coil (QDX); the dynamicer main body (QZT) structure is: the dynamicer iron core is a tube of a radial magnetic field and installed on a tubular coil skeleton, on which winding the dynamicer coil to form the dynamicer main body; after the sliders (HDZ) are installed on both ends of the dynamicer main body, which become dynamicer; a sensor group is installed on the dynamicer and the stator, to obtain some physical quantities, so as to control a size of drive current and voltage, after dynamicer coil is powered on, the current interacts with a stator magnetic field, forms electromagnetic force, and drives dynamicer movement in the stator tube (DZGD), and the dynamicer drives a load by a transmission mechanism; all magnetic tube provide radial magnetic fields, namely, an inner arc is a pole, an outer arc is another pole;

wherein a slider structure is a kind of a wheel-rail type sliding structure, rails (DG, see FIG. 1.3, FIG. 2) are installed in the stator inner arc and embedded in the stator magnetic tube (SCG) but not bulged out over the surface of the stator magnetic tube; the wheels (GL) is installed on a slider body (HDT) for slider (FIG. 2.1), wheels (GL) rotate on the rails (DG), a driving hook (QDG) is fixed on the sliders (HDZ); the rails (DG) have function of power wires and signal wires.

2. A magnetic tubes motor, comprising: a dynamicer (also known as a mover, QDZ) and a stator (STA), a length of the stator is greater than a length of the dynamicer, a structure of the stator (STA) is: a stator magnetic tube (SCG) nested into an inner wall of a pure iron tube (DTG), the stator magnetic tube (SCG) provides a radial magnetic field, a stator tube (DZGD) is formed within the stator magnetic tube (SCG), the dynamicer travels in the stator tube; the dynamicer is composed of a dynamicer main body (QZT) and sliders (HDZ), the dynamicer main body (QZT) comprises: a coil frame (XGJ), a dynamicer iron core (QTX) and a dynamicer coil (QDX); the dynamicer main body (QZT) structure is: the dynamicer iron core is a tube of a radial magnetic field and installed on a tubular coil skeleton, on which winding the dynamicer coil to form the dynamicer main body; after the sliders (HDZ) are installed on both ends of the dynamicer main body, which become dynamicer; a sensor group is installed on the dynamicer and the stator, to obtain some physical quantities, so as to control a size of drive current and voltage, after dynamicer coil is powered on, the current interacts with a stator magnetic field, forms electromagnetic force, and drives dynamicer movement in the stator tube (DZGD), and the dynamicer drives a load by a transmission mechanism; all magnetic tube provide radial magnetic fields, namely, an inner arc is a pole, an outer arc is another pole; wherein there are two models of power supply to the coil, one is through the rails (DG) power supply, the other is a cable through a driving slot (QDC), connecting a power supplier and the dynamicer coil (QDX).

3. A magnetic tubes motor, comprising: a dynamicer (also known as a mover, QDZ) and a stator (STA), a length of the stator is greater than a length of the dynamicer, a structure of the stator (STA) is: a stator magnetic tube (SCG) nested into an inner wall of a pure iron tube (DTG), the stator magnetic tube (SCG) provides a radial magnetic field, a stator tube (DZGD) is formed within the stator magnetic tube (SCG), the dynamicer travels in the stator tube; the dynamicer is composed of a dynamicer main body (QZT) and sliders (HDZ), the dynamicer main body (QZT) comprises: a coil frame (XGJ), a dynamicer iron core (QTX) and a dynamicer coil (QDX); the dynamicer main body (QZT) structure is: the dynamicer iron core is a tube of a radial magnetic field and installed on a tubular coil skeleton, on which winding the dynamicer coil to form the dynamicer main body; after the sliders (HDZ) are installed on both ends of the dynamicer main body, which become dynamicer; a sensor group is installed on the dynamicer and the stator, to obtain some physical quantities, so as to control a size of drive current and voltage, after dynamicer coil is powered on, the current interacts with a stator magnetic field, forms electromagnetic force, and drives dynamicer movement in the stator tube (DZGD), and the dynamicer drives a load by a transmission mechanism; all magnetic tube provide radial magnetic fields, namely, an inner arc is a pole, an outer arc is another pole; the magnetic tubes motor further comprises a feedback braking structure;

wherein for feedback braking, after a load is launched, the dynamicer (QDZ) is braked; specifically, kinetic energy during dynamicer braking is recovered for being electric energy of a power supply; a position sensor is installed at a position where launch is completed, and a motor state is changed into a generator state; after the load is launched, the dynamicer (QDZ) still keeps a huge amount of the kinetic energy; when the dynamicer (QDZ) reaches the position where the position sensor is, a magnetic tube motor is changed from the motor state to the generator state, so as to charging the power source with power generated by the kinetic energy of the dynamicer (QDZ).

\* \* \* \* \*